Figure 1:
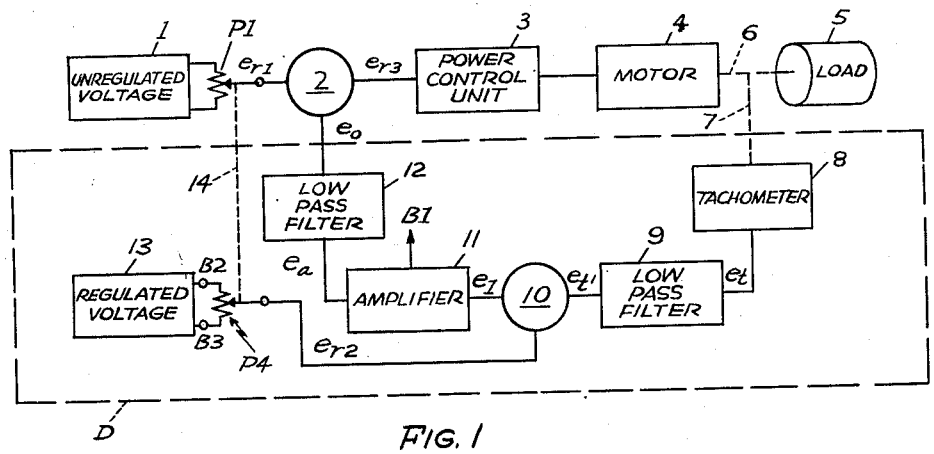

INVENTORS
WINSTON S. HARVEY
HENRY EISLER
BY Elmer J. Gorn
ATTORNEY

United States Patent Office 2,762,005
Patented Sept. 4, 1956

2,762,005

MOTOR SPEED CONTROL

Winston S. Harvey, Bedford, and Henry Eisler, Brighton, Mass., assignors to Raytheon Manufacturing Company, Newton, Mass., a corporation of Delaware Application August 13, 1953, Serial No. 374,022

8 Claims. (Cl. 318—327)

This invention relates to a motor speed control circuit particularly adapted for use with motor power control units of the type in which a control or reference potential is adjusted by a potentiometer so as to determine the amount of power which is supplied by the unit to a motor.

Power control units of the above-mentioned type customarily compensate for large variations in line voltage or the load driven by the motor. However, many applications require a very fine motor speed control which previous power control units have been unable to attain without complicated and critically adjusted circuits.

Accordingly, the main object of the present invention is to provide a simple and reliable control circuit which is adapted for easy connection to a wide variety of power control units without interfering with the characteristic operation of such units, which allows the use of components having wide tolerances, which has no critical adjustments or calibrations, and yet which provides a very fine control of motor speed.

Onother object is to provide an improved control voltage amplifier which affords twice the gain of previous amplifiers. A further object is to provide a speed control unit whose output is limited to a value allowing motor operation at a safe speed.

A still further object is to provide a control circuit which is responsive to both forward and reverse motor rotation.

In a broad aspect, the invention involves a motor speed control device for use with a power control unit of the type described and comprises tachometer means adapted to be coupled to the motor so as to produce a direct current voltage proportional to the speed of the motor, a voltage source, variable means, such as a potentiometer, for selecting from the voltage source a reference voltage proportional to a desired motor or tachometer speed, an amplifier having input and output means, connections for applying the difference between the voltage produced by the tachometer and the selected reference voltage to the amplifier input means so that the amplifier produces at its output means a correction voltage dependent on the deviation of the motor from desired speed as represented by the reference voltage, and output terminals connected to the amplifier output means and adapted to be connected in series with the speed control regulating means of the power control unit, thereby to provide a fine correction for the speed control potential applied by said regulating means to the power control unit. Specifically the aforesaid voltage source is adjustable so that the reference voltage is equal and opposite to the tachometer voltage when the motor and tachometer are driven at the desired speed as represented by the reference voltage.

Usually the present speed control device is as a unit. It may, however, be combined with any of several power control units, such as one of the thyratron types known by the trademark "Servotron," or the electromechanical type, such as an amplidyne.

In a further aspect, a diode is connected across the output terminals of the amplifier, and means are provided for biasing the diode a predetermined voltage below cutoff, whereby, if the correction voltage across the amplifier output terminals tends to exceed the predetermined voltage, the diode conducts and thereby limits the correction voltage to a volume which insures safe speed operation of the motor.

One amplifier particularly suited for use in the present invention comprises first and second stages, each including at least an anode, cathode and control electrode, voltage input means connected across the control electrode and cathode of the first stage for receiving the aforesaid difference voltage, a voltage divider connected to the anode of the first stage, the divider having two points connected to the second stage electrode and cathode, respectively, and the values of the divider being selected so that the voltage between said two points is equal to and varies in the opposite direction to the difference voltage applied to the electrode and cathode of the first stage, and output terminals connected to the respective anodes of the two stages, whereby, when the difference voltage changes, the voltages at said output terminals respectively vary in opposite directions so that the voltage across the terminals varies by an amount substantially twice the output variation of one of the stages.

Preferably there is associated with the tachometer a bridge rectifier having input terminals connected to the tachometer, and connected to tachometer output terminals such that one of said output terminls of said rectifier carries the same polarity of tachometer voltage on forward and reverse rotation of the tachometer, thus insuring that the proper difference voltage will be applied to the amplifier input terminals.

Figure 2:
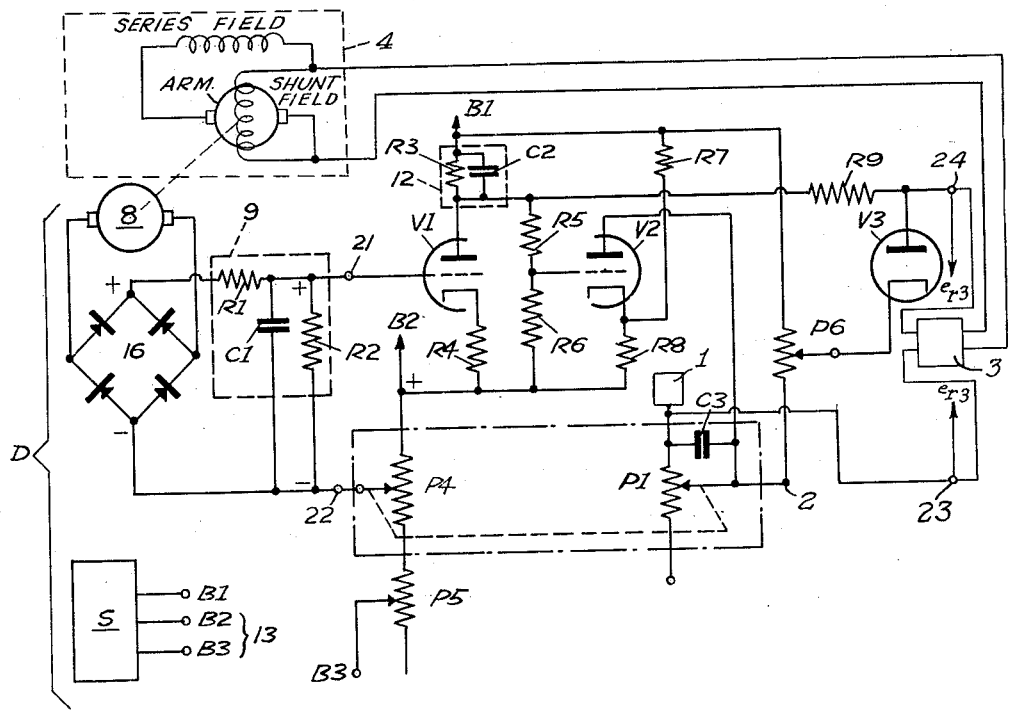

Other and further objects and features of the present invention will become apparent in the detailed description which follows, reference being made to the accompanying drawings, wherein:

Fig. 1 is a block diagram of a motor control system including a speed control device according to the present invention; and Fig. 2 is a schematic diagram illustrating one form of the present invention.

Fig. 1 illustrates diagrammatically the relation between the present speed control device D and a conventional motor power control comprising a source of unregulated voltage 1, a potentiometer P1 for selecting a reference voltage from the source 1 for application to a power control unit 3 which, in response to the reference voltage, delivers to a motor 4 the proper power for driving the motor 4 and its load 5 at a desired speed. A typical power control unit is disclosed in U. S. Patent No. 2,638,568 to C. L. Calosi.

According to the present invention, a coupling 7 is provided between the motor drive connection 6 and a tachometer 8. The tachometer 8 is a conventional device which generates a voltage $e_t$ proportional to the speed of rotation of the motor 4. The tachometer voltage $e_t$ is applied through a low pass filter 9 which removes the tachometer output ripple as well as increasing the stability of subsequent circuit elements by reducing the high frequency components of the filtered tachometer voltage $e_{t'}$. The filtered tachometer voltage $e_{t'}$ is applied to a mixing network 10. The mixing network 10 also receives a reference voltage $e_{r2}$ which is selected by a potentiometer P4 from a regulated voltage source 13. As indicated by the connection 14, the potentiometer P4 is ganged to the power control potentiometer P1 so that it selects from the regulated voltage source 13 a speed control or reference voltage $e_{r2}$ proportional to the desired speed of the tachometer and motor. The sum of the tachometer voltage $e_{t'}$ and the reference voltage $e_{r2}$ which is opposite in polarity to the tachometer voltage results in a difference voltage $e_1$ at the output of the mixing network 10. The difference voltage $e_1$ is increased by an amplifier 11 to an amplified voltage $e_a$. A second low pass filter 12 further reduces the tachometer ripple and the high frequency components of the amplified difference voltage $e_a$ and damps out sudden transients occurring in the power supplies or tachometer circuit. When the motor is rotating at the desired speed as selected by the potentiometers P1 and P4, the filtered difference voltage $e_0$ is zero. Any increase or decrease in rotation of the motor above or below the desired speed causes the difference voltage $e_0$ to vary in a negative or positive direction directly proportional to the undesired increase or decrease of motor speed. The difference voltage $e_0$ is mixed at a network junction point 2 with the power control unit reference voltage $e_{r1}$ so as to produce a resulting voltage $e_{r3}$ which causes the power controlling unit 3 to bring the motor 4 to desired speed; that is, the difference voltage $e_0$ applies a fine correction to the relatively larger control potential $e_{r1}$.

The speed control device D is shown schematically in Fig. 2. The tachometer 8 is connected to a bridge rectifier 16 having output terminals 21 and 22 and four arms in each of which is connected a selenium rectifier. The selenium rectifiers are so connected that, regardless of the direction of rotation of the motor and tachometer, terminal 21 is always positive with respect to terminal 22. A low pass filter 9 comprising two resistors R1 and R2 and a capacitor C1 also acts as a voltage divider such that the tachometer voltage across terminals 21 and 22 is proportional to the output of the tachometer 8 but somewhat reduced in amplitude.

A power supply S includes a regulated section 13 providing two potentials B2 and B3 which are relatively positive and negative and which cover the range of voltages appearing between the tachometer output terminals 21 and 22 at usual operating speeds. The two voltages B2 and B3 are applied across the speed control potentiometer P4 and a balancing potentiometer P5, the positive side of the speed control potentiometer P4 being connected through a cathode resistor R4 to the cathode of a first amplifying stage V1. The positive tachometer output terminal 21 is connected to the grid of the first stage V1, and the relatively negative tachometer terminal 22 is connected to the adjustable top of the potentiometer P4. As a result, the tap of the speed control potentiometer P4 selects a reference voltage which opposes the tachometer voltage across terminals 21 and 22. The difference between these two voltages is applied across the grid and cathode of the first amplifier stage V1.

Tubes V1 and V2 comprise a two stage amplifier 11. The anode of each of these stages is coupled directly to output terminals 23 and 24. Both the first stage V1 and the second stage V2 are normally conducting in the linear region of their gain characteristic when the difference voltage applied to the first stage V1 is zero. The voltage at the grid of the second stage V2 is dependent upon the voltage at the anode of the first stage V1, which varies according to the difference signal applied to the grid of the first stage. Positive bias is applied to the grid of the second stage V2 by voltage dividing resistances R5 and R6. The values of the voltage dividing resistances R5 and R6 are selected so that the voltage at their junction point which is connected to the grid of the second stage varies by the same value but in the opposite direction to the difference voltage applied across the grid and cathode of the first stage. Positive bias is applied to the cathode of the second stage V2 by voltage dividing resistances R7 and R8. The values of resistances R7 and R8 are selected such that the same grid to cathode bias is applied to the second stage V2 as is applied to the first stage V1 when the difference voltage across terminals 21 and 22 is zero. In this condition the voltages at the anodes of both stages will be equal and the voltage difference across the output terminals 23 and 24 will be zero. Consequently the voltages at the anodes of both stages and the output terminals 23 and 24 vary in opposite directions and thus the resultant voltage difference across the output terminals 23 and 24 varies proportionally to twice the gain of either of the amplifying stages.

At the output terminals 23 and 24 is provided a speed limiting circuit comprising resistor R9, diode V3 and potentiometer P6. Without this circuit the operation of the amplifier would be as follows: If for any reason the voltage across the tachometer terminals 21 and 22 should go to zero while the motor is running, the first amplifier stage V1 would be biased beyond cutoff by the reference voltage of the potentiometer P4 and its plate would rise to the plate voltage B1 while, on the other hand, the second stage V2 would be driven to saturation with a low plate voltage. The resulting voltage difference across the amplifier output terminals 23 and 24 might cause the motor to operate at speeds much greater than the rated value with possible damage to the driven machine or load 5. With the speed limiting circuit in operation and the speed limiting potentiometer P6 adjusted so that, with the tachometer circuit open, the speed is limited to a safe maximum value, the potentiometer P6 biases the diode V3 below cutoff by an amount which is predetermined to be the safe value at the amplifier output terminal 24. Should the terminal 24 exceed this voltage, the plate of the diode becomes positive with respect to its cathode, thus causing the diode to conduct and limiting the maximum output voltage between the output terminals 23 and 24 to a value substantially equal to the predetermined cutoff bias supplied by the potentiometer P6.

The output terminals 23 and 24 are intended to be connected in series with the variable tap of the power control unit potentiometer P1 so that the voltage difference across the terminals 23 and 24 is added to or subtracted from the control potential selected by the power control potentiometer P1. Thus the present speed control circuit can be connected to the power control unit without altering any of the circuits in that unit. If for any reason it is desired to eliminate the corrective function of the speed control unit D, it is necessary only to short the output terminals 23 and 24, whereupon the power control unit will operate as usual.

Preliminary to operating the speed control unit, the motor 4 is brought to any selected speed by simultaneous adjustment of the power control potentiometer P1 and the speed control potentiometer P4 with the output terminals 23 and 24 shorted. The short is then removed and the balancing potentiometer P5 is adjusted until the motor resumes the selected speed or until the output across the terminals 23 and 24 is zero. Thereafter speed changes may be made without further adjustment of the balancing potentiometer P5. Because the speed control circuit D operates about a normal speed control voltage of zero, accurate speed correction is not dependent upon exact linearity or balance of the power control potentiometer P1 and the speed control potentiometer P4 or any of the components of the speed control circuit, such as the amplifier tubes V1 and V2. Thus the present speed control circuit presents no tolerance problems, is easily adjusted and need not be critically calibrated. As previously mentioned, it operates on forward or reverse rotation of the tachometer 8 and, owing to the novel amplifier circuit, provides a double-ended output with a single-ended input. Despite the increased amplification available, the speed control circuit is prevented from overdriving the controlled motor by virtue of the speed-limiting circuit at its output.

Typical tube types and component values for the circuit illustrated in Fig. 2 are given by way of example only as follows:

| | |
|---|---|
| V1 | (½) 6SL7GT. |
| V2 | (½) 6SL7GT. |
| V3 | 6H6. |
| 16 | (4) DRZ. |
| C1 | 0.5 microfarad. |
| C2 | 10 microfarads. |
| C3 | 1 microfarad. |
| R1 | 47K ohms. |
| R2 | 270K ohms. |
| R3 | 100K ohms. |
| R4 | 1K ohms. |
| R5 | 1M ohms. |
| R6 | 100K ohms. |
| R7 | 68K ohms. |
| R8 | 2.7K ohms. |
| R9 | 100K ohms. |

Many variations and modifications of the invention will occur to those who are skilled in the art to which the invention relates, and it is accordingly intended that the claims that shall follow shall not be limited but only illustrated by the details of the embodiment of the invention shown and described herein.

We claim:

1. A motor control system comprising a motor, a power control unit therefor including a potentiometer having a tap adjustable to supply a control potential proportional to a desired power output, a tachometer coupled to said motor for producing a direct current voltage proportional to the instantaneous motor speed, a bridge rectifier having input terminals connected to the tachometer and output terminals, the bridge being connected such that one of said output terminals carries the same polarity of tachometer voltage on forward and reverse rotation of the tachometer, first and second amplifier stages each having at least an anode, a cathode and a control grid, a source of regulated voltage opposite in polarity to said tachometer voltage, a second potentiometer ganged to the first said potentiometer for selecting from said source a reference voltage, one of said bridge output terminals being connected to the grid of said first stage and the other being connected through said second potentiometer to the cathode of said first stage thereby to apply the difference between said tachometer and reference voltages across said grid and cathode, means for adjusting said regulated voltage source such that said reference voltage is equal to said tachometer voltage at said desired speed, a voltage dividing resistance between the anode and cathode of said first stage, a connection between the grid of the second stage and a point of said resistance carrying a voltage equal to said difference voltage at desired motor speed and varying oppositely to said difference voltage, whereby the anode voltages of said stages respectively vary in opposite directions, and the relative voltage difference between said anodes varies by substantially twice the variation of one of the stages, and amplifier output terminals connected to said anodes, respectively, said terminals connected in series with the tap of the aforesaid first potentiometer to vary the said control potential by an amount proportional to the deviation of said motor from desired speed.

2. In a speed control system, a power control unit for varying the speed of a load motor, a first voltage varying means for controlling the voltage of said power control unit, a speed measuring means for generating voltage having a direct proportion to the speed of said load motor, a regulated voltage having a second voltage varying means, mechanical coupling means connecting first voltage varying means to second voltage varying means to cause a regulated reference voltage to be formed at the output of said second voltage varying means, a first combining means for mathematically adding said reference voltage to said load motor speed measuring voltage to form a first combined voltage, protecting means to limit the value of said first combined voltage, a second combining means for mathematically adding said first combined voltage to the voltage produced by the first voltage varying means to form a second combined voltage, and means for driving said power control unit with the second combined voltage.

3. In a speed control system, a power control unit for varying the speed of a load motor, a first voltage varying means for controlling the voltage of said power control unit, a speed measuring means for generating voltage having a direct proportion to the speed of said load motor, a regulated voltage having a second voltage varying means, mechanical coupling means connecting first voltage varying means to second voltage varying means to cause a regulated reference voltage to be formed at the output of said second voltage varying means, a first combining means for mathematically adding said reference voltage to said load motor speed measuring voltage to form a first combined voltage, a diode connected across the output of said first combined voltage, biasing means to determine a value of said first combined voltage at which said diode will conduct, a second combining means for mathematically adding said first combined voltage to said voltage produced by the first voltage varying means to form a second combined voltage, and means for applying said second combined voltage to said power control unit.

4. In a speed control system, a power control unit for varying the speed of a load motor, a first voltage varying means for controlling the voltage of said power control unit, a speed measuring means for generating a voltage that varies in magnitude and direction with the speed and direction of said load motor, rectifying means connected to the output of said speed measuring means, a regulated voltage having a second voltage varying means, mechanical coupling means connecting first voltage varying means to second voltage varying means to cause a regulated reference voltage to be formed at the output of said second voltage varying means, a first combining means for mathematically adding said reference voltage to said load motor speed measuring voltage to form a first combined voltage, protecting means to limit the value of said first combined voltage, a second combining means for mathematically adding said first combined voltage to said voltage produced by the first voltage varying means to form a second combined voltage, and means for applying said second combined voltage to said power control unit.

5. In a speed control system, a power control unit for varying the speed of a load motor, a first voltage varying means for controlling the voltage of said power control unit, a speed measuring means for generating a voltage having a direct proportion to the speed of said load motor, a regulated voltage having a second voltage varying means, mechanical coupling means connecting first voltage varying means to second voltage varying means to cause a regulated reference voltage to be formed at the output of said second voltage varying means, a first combining means for mathematically adding said reference voltage to said load control speed measuring voltage to form a first combined voltage, a direct coupled two stage amplifying means having a single-ended input push-pull output to have a gain two times that of either stage, connecting means for connecting the first combined voltage to said single-ended input, protecting means to limit the value of said amplified first combined voltage, a second combining means for mathematically adding said amplified first combined voltage from said push-pull output to said voltage produced by the first voltage varying means to form a second combined voltage, and means for applying said second combined voltage to said power control unit.

6. In a speed control system, a power control unit for varying the speed of a load motor, a first voltage varying means for controlling the voltage of said power control unit, a speed measuring means for generating a voltage having a direct proportion to the speed of said load motor, a regulated voltage having a second voltage varying means, mechanical coupling means connecting first voltage varying means to second voltage varying means to cause a regulated reference voltage to be formed at the output of said second voltage varying means, a first combining means for mathematically adding said reference voltage to said load control speed measuring voltage to form a first combined voltage, a direct coupled electronic amplifier comprising a first and second stage having a single-ended input and a double-ended push-pull output, each stage including at least an anode, cathode and controlled electrode, voltage input means connected across the controlled electrode and cathode of said first stage, a voltage divider connected to the anode of the first stage, said divider having a tap connected to the second stage controlled electrode, the value of the tap being such that the voltage developed across the tap is equal and opposite to the voltage developed across the controlled electrode and cathode of the first stage, output terminals connected to the respective anodes of said stages to be in push-pull output, protecting means to limit the value of said amplified first combined voltage, a second combining means for mathematically adding said amplified first combined voltage from said first push-pull output to said voltage produced by the first voltage varying means to form a second combined voltage, and means for applying said second combined voltage to said power control unit.

7. A direct coupled electronic amplifier comprising first and second stages having a single-ended input and a double-ended push-pull output, each stage including at least an anode, cathode and controlled electrode, voltage input means connected across the controlled electrode and cathode of said first stage, a voltage divider connected to the anode of the first stage, said divider having a tap connected to the second stage controlled electrode, the value of the tap being such that the voltage developed across the tap is equal and opposite to the voltage developed across the controlled electrode and cathode of the first stage, output terminals connected to the respective anodes of said output stages in push-pull output and the voltage input to vary the voltage output of stages one and two respectively in opposite directions, said output voltage to vary by an amount substantially twice the variation of one of the stages.

8. In a speed control system, a power control unit for varying the speed of a load motor, a first voltage varying means for controlling the voltage to said power control unit, a speed measuring means for generating a voltage that varies in magnitude and direction with the speed and direction of said load motor, rectifying means connected to the output of said speed measuring means, a regulated voltage having a second voltage varying means, mechanical coupling means connecting first voltage varying means to second voltage varying means to cause a regulated reference voltage to be formed at the output of said second voltage varying means, a first combining means for mathematically adding said reference voltage to said load motor speed measuring voltage to form a first combined voltage, a direct coupled two stage amplifying means having a single-ended input push-pull output to have a gain of two times that of either stage, connecting means for connecting the first combined voltage to said single-ended input, a diode connected across the push-pull output plates of said combined voltage amplifier, biasing means to determine the value of said amplified first combined voltage at which said diode will conduct, a second combining means for mathematically adding said amplified first combined voltage from said push-pull output to said voltage produced by the first voltage varying means to form a second combined voltage, and means for driving said power control unit with the second combined unit.

References Cited in the file of this patent

UNITED STATES PATENTS

| | | |
|---|---|---|
| 2,240,289 | Dillenburger | Apr. 29, 1941 |
| 2,273,934 | Campbell | Feb. 24, 1942 |
| 2,462,751 | Koenler | Feb. 22, 1949 |
| 2,484,089 | Haynes | Oct. 11, 1949 |
| 2,496,881 | Livingston | Feb. 7, 1950 |
| 2,519,057 | Luck | Aug. 15, 1950 |